Dec. 26, 1967     H. HORA     3,360,324
LIGHT DISPLACEMENT CONTROL SYSTEM
Filed Oct. 16, 1962
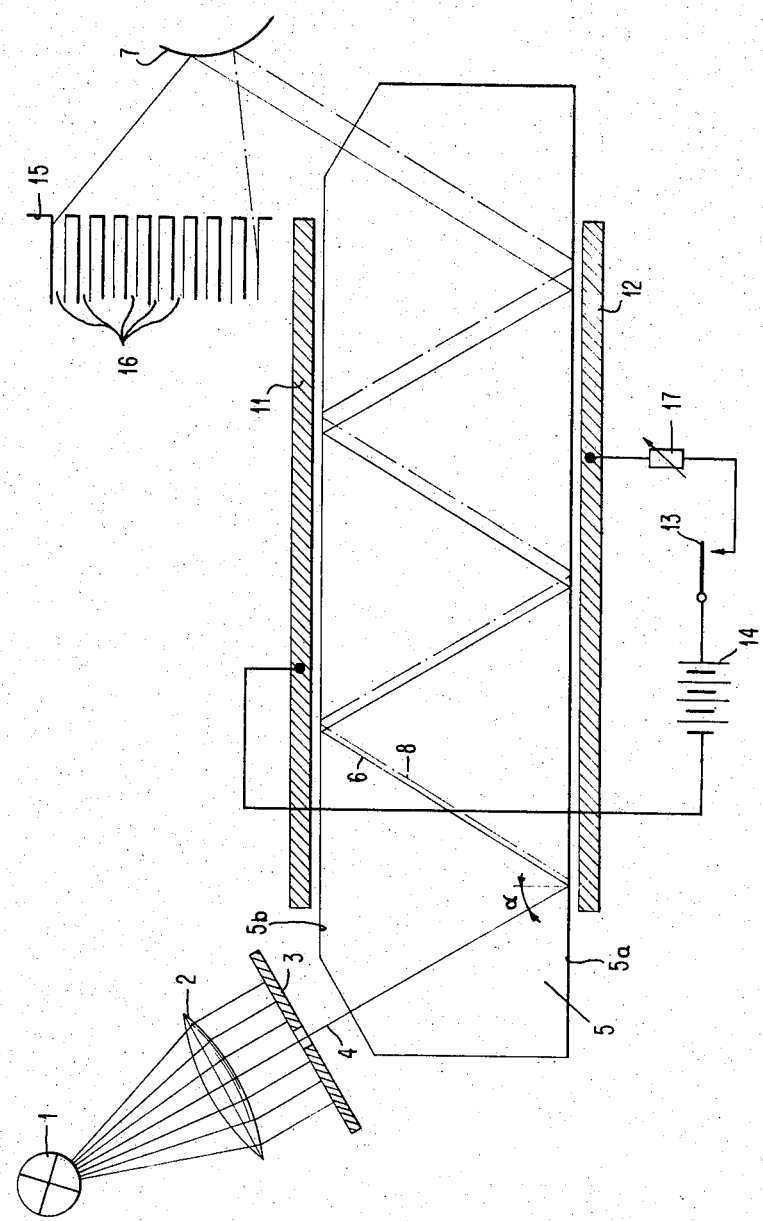
INVENTOR
HEINRICH HORA
BY *Stephen J. Limanek*
ATTORNEY

United States Patent Office 3,360,324
Patented Dec. 26, 1967

3,360,324
LIGHT DISPLACEMENT CONTROL SYSTEM
Heinrich Hora, Boblingen, Wurttemberg, Germany, assignor to International Business Machines Corporation, New York, N.Y., a corporation of New York
Filed Oct. 16, 1962, Ser. No. 230,968
Claims priority, application Germany, Oct. 16, 1961, J 20,659
11 Claims. (Cl. 350—160)

This invention relates to a system for controlling light rays and more particularly to a system for displacing or deflecting a beam of light.

It is known that light rays may be controlled by employing mechanically movable diaphragm arrangements, which in photography are known as shutters, to provide opening intervals for as short a period of time as $10^{-3}$ seconds. These mechanical arrangements have proved useful in photographic fields for many years.

For shorter opening time intervals, so called electro-optical shutters have been developed in the form of electronic image converters, Kerr cells or ferroelectric condensers. By employing these electro-optical shutters, it is possible to realize closing and opening times, respectively, ranging down to $10^{-9}$ seconds. Besides their extremely high speed of operation, such shutters have the additional advantage that, due to the lack of mechanically moving parts, they are not subject to wear. However, the disadvantages of such arrangements, which satisfy high requirements with respect to speed, safety and resistance to wear, include the relatively high number of technical components, the complicated structure as well as the fact that their control requires electric potentials in the order of several thousand volts. Moreover, most of these arrangements are very large and bulky, so that their use is limited for many purposes.

Accordingly, it is the object of this invention to provide an improved light control system.

It is another object of this invention to provide an improved light deflection system.

Still another object of this invention is to provide a light deflection system which is of an extremely simple structure.

A further object of this invention is to provide an inexpensive light deflection system.

Still a further object of this invention is to provide a light deflection system which is very rugged and of relatively small size.

Yet a further object of this invention is to provide a light deflection system which is responsive to relatively low voltage compared to the voltage required to operate known light deflection systems.

In accordance with the present invention, a system is provided for controlling light which includes a light transparent body made of a substance that is influenced by electric fields wherein a light ray is repeatedly reflected at an angle close to the limiting angle of total reflection, or critical angle, or in the angle of total reflection between two surfaces of the substance in a manner such that the ray leaves the substance with a displacement equal to the sum of the partial displacements produced at each reflection point at the two surfaces.

An important advantage of the light control system of the present invention is that a relatively simple structure produces a relatively large deflection of a light beam.

An important feature of this invention is that the amount of deflection or displacement of a light beam is dependent upon the number of internal reflections within the light transparent body of the system and is proportional to the strength of the electric field in which the body is located.

The foregoing and other objects, features and advantages of the invention will be apparent from the following more particular description of the preferred embodiment of the invention, as illustrated in the accompanying drawing.

In the drawing:

In the drawing the single figure is a schematic diagram of an embodiment of the present invention.

Referring to the figure of the drawing in more detail there is shown a monochromatic light source 1, for example, a laser, producing a beam directed through a lens 2 for providing parallel rays to a diaphragm 3 having an aperture therein. The aperture in the diaphragm 3 permits a narrow region 4 of the light beam to pass through the diaphragm 3 to a light transparent body 5, which, for example, is made of potassium di-hydrogen phosphate. The light passing through the body 5 is represented simply by a single line 6 in the interest of clarity. The direction of the ray 6 through the body 5 is so selected that total internal reflection takes place at a bottom limiting plane surface 5a and then at a top limiting plane surface 5b disposed parallel to bottom surface 5a of the body 5.

Thereafter additional total internal reflections are made by the ray 6 at the bottom and top surfaces 5a and 5b until the ray 6 emerges from the body 5. The angle of incidence of the ray 6 at the bottom surface 5a is indicated as α in the figure of the drawing. This angle is so chosen that total reflection occurs even at an angle differing from the limiting angle for a finite amount of more than 0.001 radian. As further shown in the figure the ray 6 emerges from the body 5 after several reflections at the bottom and top limiting surfaces 5a and 5b of the body 5 to impinge upon a reflecting curved surface 7.

A pair of electrodes 11 and 12 are disposed with respect to the top and bottom surfaces 5b and 5a of the body 5 so as to produce an electric field in the body 5 when a voltage is applied thereto. The circuit for applying a voltage between the electrodes 11 and 12 includes a switch 13 serially connected to a voltage source 14 and any suitable known means 17, which may include a variable resistor arrangement, for varying or regulating the voltage between the electrodes 11 and 12. The electrodes 11 and 12 are further disposed with respect to the body 5 so as to provide between each of the electrodes 11 and 12 and the body 5 a substance, for example, air, having a refractive index such that a desired refractive index difference is insured at the limiting surfaces 5a and 5b of the body 5. The body 5 of the system of the present invention should be made of a substance exhibiting a high Kerr effect which, for example, may be carbon disulphide, potassium dihydrogen or such similar materials.

A diaphragm 15 having a plurality of light conducting channels 16, or light responsive elements, coupled to utilizing devices (not shown) is disposed so as to intercept the light rays reflected from the reflecting surface 7.

In the operation of the embodiment of the present invention illustrated in the drawing, the light ray from the source 1 travels along path 6 through the body 5 to impinge upon the reflecting surface 7 and enter into the topmost channel of the plurality of channels 16 when the switch 13 is in its open position. When the switch 13 is placed in its closed position, an electric field is produced between the electrode 11 and 13 which changes the index of refraction of the body 5. Accordingly, due to an effect known as the Goos-Hänchen effect, the light ray from the source 1 now travels along a path 8 displaced from the path 6, by an amount depending upon the magnitude of the voltage between electrodes 11 and 12 and the number of reflections produced by the bottom and top surfaces 5a and 5b, striking a different area of the curved reflecting surface 7 and entering into the bottom-most channel of the plurality of channels 16. If now with the switch 13 closed, the means 17 for varying the voltage between electrodes 11 and 12 is actuated so as to produce a voltage between electrodes 11 and 12 which is intermediate the voltages required to direct the ray along paths 6 and 8, the ray passing through the body 5 will enter one of the channels 16 intermediate the top-most and bottom-most channels of the plurality of channels 16. It is, of course, also possible to make the light ray so wide that on a rocking movement thereof it will alternately impinge upon one or two channels of the plurality of channels 16.

It should be understood that when an electric field is not applied to the body 5 by the electrodes 11 and 12, the light ray follows the path 6 through the body 5 wherein the point of reflection of the ray is substantially the same point as the point of incidence. However, when the switch 13 is closed there is produced between the electrodes 11 and 12 an electric field which changes the refractive index of the body 5. When this refractive index is changed the limiting angles of total reflection of the ray 6 at the reflection points at the bottom and top surfaces 5a and 5b are changed in such a manner that the reflected ray is not reflected by the same point of the limiting surface upon which the incoming ray impinges. A sidewise displacement occurs on each reflection as indicated by the different points of reflection for rays 6 and 8 and there results a total displacement of the ray 8 with respect to ray 6 which is equal to the sum of the individual displacements produced at each reflection. The effect which produces the sidewise displacement of the light ray, that is, the Goos-Hänchen effect, consists in the fact that a ray reflected very close to the angle of total reflection, or critical angle, at a limiting surface of a body is not reflected by the same point of the limiting body upon which the incoming ray impinges but is sidewise displaced in the direction of incidence. As the limiting angle of total reflection is dependent on the refractive index difference of the substances contacting each other at a limiting surface it is possible to control the displacement of the exit ray from the body by changing the refractive indices of one or both of the substances at the limiting surface or interface between the two substances. Accordingly by utilizing a light transparent plane parallel plate with condenser coatings appreciable light displacement may be produced in accordance with the teachings of the present invention.

As described hereinabove, depending upon the intensity of the applied electric field, the light ray encounters one of the plurality of receiving elements 16 to be thereafter processed optically or electrically. It is also possible to select the cross section of the light ray or arrange the individual ones of said elements 16 in such a manner that a plurality thereof are respectively impinged simultaneously. In this manner, a two- or multi-path switch for ray beams is provided. If in one condition of the electric field the ray is directed upon a diaphragm or a deflecting element disabling it and in the other condition of the field to a utilizing member, the special case of a light shutter results. If, on the other hand, it is desired to modulate the light ray in accordance with the intensity of the applied electric field, a diaphragm is so placed into the path of the emerging ray that in one limiting position the ray passes therethrough unobstructedly, that in the other limiting position it is completely interrupted and that in the individual intermediate positions it is more or less absorbed.

In accordance with an especially advantageous embodiment of this invention, the entrance and exit surfaces, respectively, of the body 5 is so arranged that the entering and the emerging rays, respectively, penetrate them perpendicularly. In this manner, undesired losses of light due to dispersion or refraction effects and other undesired secondary phenomena are avoided to a maximum degree. It is, however, also possible to design the entrance surface of the light transparent body 5 so that it forms an acute angle with the direction of the entering light ray. Thus, in case of changes in the refractive index by changes in the angle of refraction a change in the angles of reflection of the ray repeatedly reflected within the body 5 is produced. This change in the angles of reflection at each point of reflection results in a further sidewise displacement of the light ray to be added to the displacement effected by the sidewise displacement effect.

It is preferable that the angles of the impinging light ray and of the entrance surface be so selected that that angle which is optimum for the Goos-Hänchen sidewise displacement effect is attained, when the electric field is changed, by the summation of the effects caused by the controllable refraction and the change in the limiting angle of the total reflection. An arrangement constructed in accordance with these principles is extremely sensitive since in the body 5 three effects are added to one another, namely, the displacement due to the Goos-Hänchen effect, the displacement caused by the change in the angle of refraction and an increase in the first mentioned effect resulting from the last mentioned change.

Accordingly, it can be seen that, as compared to known arrangements, the system of this invention has the advantage of being of an extremely simple structure and, therefore, inexpensive, mechanically extremely robust and relatively small-sized. An additional advantage of this invention consists in the relatively low voltages required for control purposes, as even relatively small displacements at individual reflection points result in technically utilizabe total displacements due to the frequent reversal of the ray, which total displacements may be converted into considerable angular deflections by the above mentioned reflection and deflection surfaces, respectively. The deflections of the ray emerging from the light transparent body 5 may, of course, also be produced by lens-type elements. A further increase of the effect is obtained by reflecting the light ray at limiting surfaces of substances which under the action of the applied electric field change their refractive indices in different directions.

It should be further understood that the invention also covers light transparent bodies of other than straight-line shapes, such as cylindrically or spirally curved bodies.

It is, of course, also possible to change, instead of the refractive index of the body 5 of the figure of the drawing, the refractive index of substances adjoining the limiting surfaces of that body. The electric field required for those changes is preferably produced by providing separate pairs of electrodes for each reflecting surface.

While the invention has been particularly shown and described with reference to a preferred embodiment thereof, it will be understood by those skilled in the art that various changes in form and details may be made therein without departing from the spirit and scope of the invention.

What is claimed is:
1. A light control system comprising
   a body of material exhibiting the Kerr effect and having a limiting surface,
   means for directing a light beam through said body so as to be repeatedly totally reflected at given points at said surface at substantially the limiting angle of total reflection and
   means for providing a variable electric field in said body so as to vary the index of refraction thereof via said Kerr effect,
   whereby said light beam is on the application of an electric field displaced in parallel to itself at said surface via the Goos-Hänchen effect on each reflection by an amount proportional to such field so that the beam emerging from said body is displaced by an amount equal to the sum of the displacement at each of said given points.
2. A light control system comprising
   a body of material exhibiting the Kerr effect and having a pair of limiting surfaces,
   means for directing a light beam through said body so as to be reflected a plurality of times at an angle substantially equal to the limiting angle of total reflection at said pair of surfaces and means for providing a variable electric field in said body so as to vary the index of refraction thereof via said Kerr effect to obtain displacement of said beam at said surfaces, whereby said light beam is on the application of an electric field displaced in parallel to itself at said surface via the Goos-Hänchen effect on each reflection by an amount proportional to such field so that the beam emerging from said body is displaced by an amount equal to the sum of the displacement at each of said given points.

3. A light control system as set forth in claim 2 wherein
said pair of limiting surfaces are plane surfaces.

4. A light control system as set forth in claim 3 wherein
said plane surfaces are disposed parallel to each other.

5. A light control system as set forth in claim 2 wherein
said body is made of carbon disulphide.

6. A light control system as set forth in claim 2 wherein
said body is made of potassium dihydrogen phosphate.

7. A light control system as set forth in claim 2 further including
means having a curved reflecting surface for intercepting the reflected light beam.

8. A light control system as set forth in claim 7 further including
a plurality of light receiving elements disposed to intercept the light beam from said curved surface.

9. A light control system as set forth in claim 2 wherein
said body further includes an entrance surface and an exit surface disposed perpendicularly to the directions of the beam at the entrance to said body and at the exit from said body, respectively.

10. A light control system as set forth in claim 2 wherein
said body further includes a light beam entrance surface lying at an acute angle with respect to the direction of the light beam at the entrance to said body.

11. A light control system as set forth in claim 2 wherein
said means for providing a variable electric field includes a pair of electrodes disposed so as to contain said body and means for applying a variable voltage to said electrodes.

References Cited

UNITED STATES PATENTS

| | | | |
|---|---|---|---|
| 1,789,521 | 1/1931 | Feingold | 88—61 X |
| 2,467,325 | 4/1949 | Mason | 88—61 |
| 2,692,952 | 10/1954 | Briggs | 88—61 X |
| 2,836,652 | 5/1958 | Sprague | 88—61 |

OTHER REFERENCES

Morgan, "Introduction to Geometrical and Physical Optics," McGraw-Hill, New York, 1953, pp. 360 and 361.

JEWELL H. PEDERSEN, *Primary Examiner.*

J. L. CHASKIN, R. L. WIBERT, *Assistant Examiners.*